Sept. 21, 1965   A. HARDY   3,206,997
GEARING
Filed Nov. 16, 1960

INVENTOR.
Alexander Hardy
BY
Hugh L. Fisher
ATTORNEY

United States Patent Office 3,206,997
Patented Sept. 21, 1965

3,206,997
GEARING
Alexander Hardy, Detroit, Mich., assignor to General Motors Corporation, Detroit, Mich., a corporation of Delaware
Filed Nov. 16, 1960, Ser. No. 69,678
12 Claims. (Cl. 74—462)

This invention relates to improvements in gearing systems and is particularly concerned with the reduction of gear noise.

In many instances, the noise produced by a power transmission system is very objectionable. One such instance occurs with an automobile transmission, for their quieter operation now accentuates transmission noises that formerly were not perceptible. An investigation of these noises has discovered that the gearing itself is the chief source and this is particularly true of planetary gearing where planet pinions revolve at very high speeds. Unless the gear tooth action is exceptionally smoth, the magnitude of the vibration amplitudes will produce objectionable disturbances clearly within the audible range.

Of course, the solution appears to reside in the provision of perfect gears, but perfect gears cannot as a practical matter be fabricated in accordance with presently accepted mass production techniques. Nor are complex acoustic attenuating systems a solution to the problem since the cost and space demands are prohibitive.

It is, therefore, proposed to provide a novel and simple method of reducing gear produced noise in a manner that can be accomplished in accordance with usual volume production equipment.

The invention contemplates reducing gear noise by decreasing the amplitude of the natural tooth engagement frequency impulses. In accomplishing this, the invention further contemplates reducing the amount of energy devoted to producing the natural frequency impulses by a unique provision wholly within the system.

More specifically stated, the invention seeks to provide gearing in which controlled acoustic impulses are generated at a frequency different from the frequency of the natural tooth engagement impulses and by so doing causing the amount of energy available for producing the natural frequency impulses to be reduced correspondingly.

Another related and even more exact aim of the invention is to accomplish the foregoing energy absorption by altering the tooth contour of one of a group of coacting gears according to a certain scheme so as to change the tooth contact pressure during a given cycle.

The foregoing and other objects and advantages of the invention will be apparent from the following description and the accompanying drawings in which.

Figure 1:
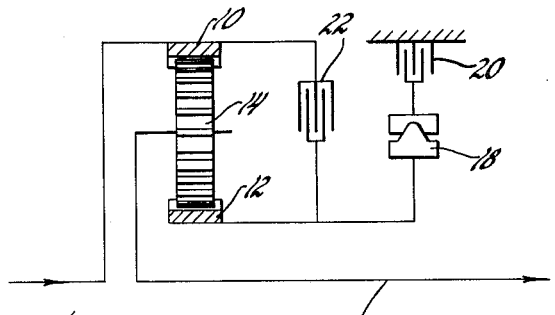
FIGURE 1 is a schematic showing of a gearing system utilizing the invention.

Referring to the drawings in detail, and particularly to FIGURE 1, the gearing therein displayed includes an input ring gear 10 and a reaction sun gear 12. Intermeshing with these gears 10 and 12 is one or more planet pinions 14, each of which is revolvably supported on an output planet carrier 16. The use of planetary gearing is only for demonstration purposes. Actually, the principle to be described can be applied to any type of gearing or arrangement thereof.

For a reduced drive ratio, the reaction sun gear 12 is restrained from backward rotation relative to the forwardly rotated input ring gear 10 through the agency of a one-way device 18 and a ground brake 20. The one-way device 18 may be of any known construction employing wedging elements, such as rollers, sprags, or the equivalent between two races one of which is restrained from rotation as by the ground brake 20. In this way, the output planet carrier 16 will be revolved in the same sense as the input ring gear 10 but at a reduced speed.

If a direct drive is wanted, a clutch 22, in this embodiment interposed between the ring and sun gears 10 and 12, may be engaged, whereupon the one-way device 18 will release and the sun gear 12, pinions 14, and the carrier 16 will all be caused to rotate at the same speed as the input ring gear 10. As will be understood by those familiar with the art, the clutch 22 as an alternative may join either the ring gear 10 or the sun gear 12 with the carrier 16 in order to effect a direct drive.

When this planetary gearing is conditioned for direct drive, there is no planetating action, and hence, there is no generation of any noise due to the relative rotation of the various gears, but when the gearing is conditioned for a reduced drive, there is relative rotation between the gears. Then as the teeth of the pinions 14 move into and out of engagement with the mating teeth of the ring and sun gears 10 and 12, there is initially upon engagement, an angular deceleration followed by an angular acceleration. This produces impacts, or acoustic impulses.

To exemplify this generation of acoustic impulses, and without limitation, assume that the ring gear 10 has 60 teeth; the sun gear 12, 30 teeth; and the planet pinions 14, 15 teeth. When the planetary gearing is conditioned for an underdrive, the pinions 14 will, due to the resultant ratio, revolve one-third times faster than the ring gear 10. If the ring gear 10 is turning at 1000 r.p.m., the carrier 16 will be revolving at a speed of 667 r.p.m. and hence the relative speed between the ring gear 10 and the carrier 16 will be 333 r.p.m. The natural tooth engagement frequency will then be the product of this relative speed and the number of teeth on the ring gear 10 or 19,980 impacts or acoustic impulses per minute. This many impacts can produce a high pitch noise, the loudness of which will be dependent upon the amplitude of these acoustic impulses.

Figure 2:
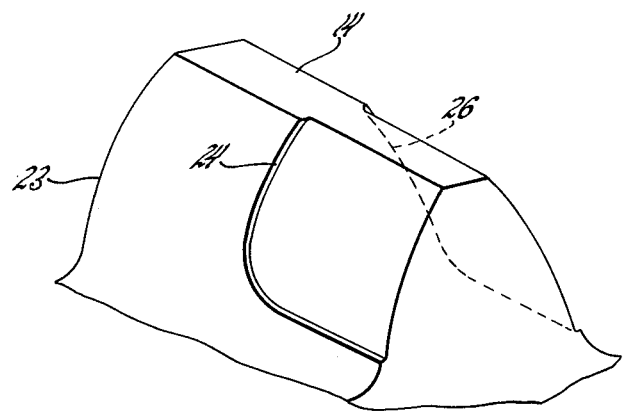
FIGURE 2 is a view of a tooth altered in accordance with the invention.

For this reason, the amplitude of the acoustic impulses is decreased by reducing the energy devoted to developing the impulses at the natural tooth engagement frequency. Specifically, a portion of this energy is used to develop controlled impulses of a substantially lower frequency and of an amplitude that will not be offensive in an audible manner. A redistribution of the equal tooth to tooth energy is effected so as to cause energy to be accumulated by certain ones of the teeth and thereby create a new frequency of acoustic impulses lower than the natural tooth engagement frequency impulses. In the preferred embodiment, this is accomplished by a so-called "phasing" technique, i.e., the pinion 14 has controlled irregularities generated in the tooth arrangement. One way of producing these controlled irregularities is shown in FIGURE 2 where a pinion tooth 23 is relieved along the working faces, i.e., the impulse generating part of the tooth, on either one or both sides at 24 and 26 as determined by the application. For demonstration purposes and again without limitation, a 15-tooth pinion having tooth numbers 1, 9, and 14 is relieved over approximately one-half of the working face width and to a minimum depth of approximately .002 of an inch below the normal involute profile and below the start of the active profile has been found to operate very satisfactorily. In actual practice the relief is preferably made in the heavy contact area of the impulse generating part of the tooth. The FIGURE 2 tooth 23 as shown is helical and the relief has been made in the leaving end of the tooth where the heavy contact area normally exists, keeping in mind that it is basic to quiet gear operation that a tooth must enter lightly and leave heavily during an engagement.

The actual phenomenon that takes place will be understood if it is kept in mind that each engagement of unaltered teeth results in a certain tooth contact pressure, due to the assumption of a certain amount of the input energy by each set of engaging teeth. When one of the teeth is relieved as suggested, it cannot initially assume its share of the energy. Because normally two or three teeth are always in engagement, the tooth ahead and the tooth behind the relieved tooth must assume the extra load. As a result, the relieved tooth tends to be unloaded until adjacent teeth deflect enough to permit the load to be applied to the relieved tooth. This action produces an initial angular deceleration greater than that occurring between unaltered teeth followed by an angular acceleration at a greater rate than the normal angular acceleration. Because, as explained, the acceleration and deceleration produce the impacts or acoustic impulses it can be seen that now another impulse is generated determined by the number of relieved teeth, which will of course have a frequency substantially lower than the natural tooth engagement frequency. Necessarily, some of the energy that would have supplemented the amplitude of the natural frequency impulses has been utilized, and in this way the noise can be kept at an agreeable level.

Figure 3:
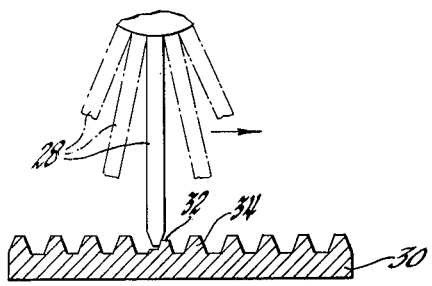
FIGURE 3 is a schematic illustration of a gear rack used to demonstrate the theory of operation.

To illustrate further this phenomenon, reference is made to FIGURE 3, wherein the principle can be demonstrated by moving a flexible spoke 28 across the teeth of a stationary 10-tooth rack. If all of the teeth of the rack 30 are at the same height and the flexible spoke 28 is moved across the 10-tooth of the rack 30 in the direction of the arrow, there will be 10 impacts for the time interval required. If this time interval is one minute, then the natural tooth engagement frequency would be 10 acoustic impulses per minute. Now, if one of the rack teeth is altered, such as the reducing of the size of a tooth 32, and if the flexible spoke 28 is moved across the rack teeth at the same speed, the energy consumed by the reduced tooth 32 when it is hit by the flexible spoke 28 will be less than that consumed by those teeth ahead of tooth 32. Consequently, the subsequent tooth 34 will consume more energy. Assuming that actual contact is made with each tooth, the resultant stronger impact with the susbequent tooth 34 will cause the flexible spoke 28 to barely touch the next few teeth. This redistribution of the equal tooth to tooth energy will produce a different impulse due to the impact of the spoke 28 with the subsequent raised tooth 34, and it will have a new lower frequency of one impulse per minute or cycle. As a result, the average amplitude of the higher natural frequency impulses is attenuated by the mere touching of or the decreased pressure on the teeth following the subsequent tooth 34. In actual practice the new lower frequency will be less objectionable and the higher frequency will become less audible. If it is considered that there are several radial spokes 28 as those shown by broken lines and that they are being caused to revolve, the analogous gear action described with respect to the planet pinion 14 would be reproduced.

From the preceding explanation, it can be seen that by a very simple expedient the gear noise produced by a gear set can be accurately controlled internally as distinguished from resorting to complex vibration dampeners and without substantially reducing the torque capacity of the gearing.

The invention is to be limited only by the following claims:

What is claimed is:

1. Method of producing an acoustical effect in a set of engaging tooth members comprising the altering of the relationship between certain ones of the engaging teeth of the set according to a predetermined scheme and revolving the set of engaging tooth members at a certain natural tooth engagement frequency so as to generate acoustic impulses of a frequency different from and in addition to the certain frequency of the natural tooth engagement acoustic impulses thereby consuming a portion of the natural impulse producing energy so as to attenuate the average amplitude of the natural tooth engagement impulses.

2. Method of producing an acoustical effect in a gear set comprising the altering of the contact pressure between a certain number of the engaging teeth and revolving the gear set at a certain natural tooth engagement frequency so as to cause the gear set to generate acoustic impulses of a frequency different from and in addition to the certain frequency of the natural tooth engagement acoustic impulses an thereby cause the average amplitude of the impulses generated at the certain natural tooth engagement frequency to be reduced.

3. Method of producing an acoustical effect in a pair of mating gears comprising the removing of stock from a certain number of teeth on one of the gears according to a predetermined sequence and revolving the mating gears at a certain natural tooth engagement frequency so as to cause the mating gears to generate acoustic impulses of a frequency less than and in addition to the certain frequency of the natural tooth engagement acoustic impulses thereby reducing the amount of energy available for producing the natural impulses and causing the average amplitude of the impulses generated at the certain natural tooth engagement frequency to be reduced.

4. In combination, a pair of revolvably mounted and engaging gears, one of the gears having controlled irregularities therein so as to generate acoustic impulses of a different frequency from and in addition to the frequency of the natural tooth engagement acoustic impulses of the pair of gears thereby consuming a portion of the natural impulse producing energy and causing the amplitude of the natural tooth engagement impulses to be altered.

5. In combination, a pair of revolvably mounted and engaging gears, one of the gears having certain ones of the tooth contours altered according to a predetermined scheme so as to produce acoustic impulses of a frequency different from and in addition to the frequency of the natural tooth engagement acoustic impulses of the pair of gears and thereby reduce the noise generated by the pair of gears by consuming a portion of the natural impulse producing energy.

6. In combination, a pair of revolvably mounted and engaging gears, one of the gears being arranged so that different tooth contact pressures occur between a certain number of the engaging teeth and according to a certain sequence so as to cause acoustic impulses of a frequency different from and in addition to the frequency of the natural tooth engagement acoustic impulses of a pair of gears to be generated and thereby reduce the noise generated by the pair of gears by consuming a portion of the energy otherwise devoted to producing the natural frequency impulses.

7. In combination, a pair of revolvably mounted and engaging gears, one of the gears having stock removed from a certain number of the teeth in a predetermined sequence and along the impulse generating part of each tooth so as to cause the gear set to generate acoustic impulses of a lower frequency than and in addition to the frequency of the natural tooth engagement acoustic impulses for the pair of gears and thereby cause a portion of the natural impulse producing energy to be reduced and accordingly the average amplitude of the impulses generated at the natural tooth engagement frequency to be reduced.

8. In combination, a pair of revolvably mounted and engaging gears, one of the gears having stock removed along a predetermined portion of one of the working faces of certain ones of the teeth in a predetermined order so as to produce acoustic impulses of a lower frequency than and in addition to the frequency of the natural tooth engagement acoustic impulses from the pair of gears thereby causing a portion of the natural impulse producing energy to be consumed and accordingly the average amplitude of the impulses generated at the natural tooth engaging frequency to be reduced.

9. In a planetary gear set, the combination of input, output, and reaction elements, one of the elements having a planet pinion revolvably support thereon, the planet pinion having controlled irregularities so as to generate as a result thereof acoustic impulses of a frequency different from the frequency of the natural tooth engagement acoustic impulses for the gear set thereby consuming a portion of the natural impulse producing energy and accordingly causing the amplitude of the impulses at the natural tooth engagement frequency to be reduced.

10. In a planetary gear unit, the combination of input, output, and reaction elements, one of the elements having a planet pinion revolvably supported thereon, the planet pinion being arranged to have different contact pressures between a certain number of engaging teeth so as to generate acoustic impulses of a frequency lower than and in addition to the frequency of the natural tooth engagement impulses for the gear set an thereby cause a portion of the natural impulse producing energy to be absorbed and accordingly the average amplitude of the impulses generated at the natural tooth engagement frequency to be reduced.

11. In a planetary gear unit, the combination of input, output, and reaction elements, one of the elements having a planet pinion revolvably supported thereon, the planet pinion having stock removed from certain ones of the teeth in a predetermined sequence and along the impulse generating part of each tooth so as to generate as a result thereof acoustic impulses of a lower frequency than and in addition to the frequency of the natural tooth engagement impulses for the gear set an thereby cause a portion of the natural impulse producing energy to be absorbed and accordingly the amplitude of the impulses generated at the natural tooth engagement frequency to be reduced.

12. In a planetary gear unit comprising sun and ring gears, and a planet carrier having a planet pinion revolvably supported thereon and so arranged as to engage with the sun and ring gears, the planet pinion having stock removed along the heavy contact area of one of the impulse generating parts of certain ones of the teeth in a predetermined sequence so as to generate as result thereof acoustic impulses of a lower frequency than and in addition to the frequency of the natural tooth engagement impulses for the gear set and thereby cause the energy otherwise available for producing the natural impulses to be reduced and accordingly the average amplitude of the impulses generated at the natural tooth engagement frequency to be reduced.

References Cited by the Examiner
UNITED STATES PATENTS

| | | | |
|---|---|---|---|
| 1,329,535 | 2/20 | McGroth | 74—462 |
| 1,766,153 | 6/30 | Trbojenick | 74—462 X |
| 1,803,293 | 4/31 | Bethune | 74—443 |
| 1,803,294 | 4/31 | Bethune | 74—443 |
| 2,761,327 | 9/56 | Sawyer et al. | 74—443 |
| 2,932,992 | 4/60 | Larsh | 74—801 X |

DON A. WAITE, *Primary Examiner.*

BROUGHTON G. DURHAM, *Examiner.*